(12) United States Patent
Carlson et al.

(10) Patent No.: US 9,469,941 B2
(45) Date of Patent: Oct. 18, 2016

(54) PARABEN DERIVATIVES FOR PRESERVING CELLULOSIC MATERIALS

(75) Inventors: William B. Carlson, Seattle, WA (US); Gregory D. Phelan, Cortland, NY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 932 days.

(21) Appl. No.: 13/461,475

(22) Filed: May 1, 2012

(65) Prior Publication Data
US 2013/0004785 A1     Jan. 3, 2013

(51) Int. Cl.
| | |
|---|---|
| *B27K 3/15* | (2006.01) |
| *D21H 21/14* | (2006.01) |
| *B27K 3/38* | (2006.01) |
| *B27K 3/08* | (2006.01) |
| *C08L 97/02* | (2006.01) |
| *C08L 33/08* | (2006.01) |
| *C08L 33/10* | (2006.01) |
| *C08L 33/24* | (2006.01) |
| *D21H 17/37* | (2006.01) |
| *D21H 17/57* | (2006.01) |

(52) U.S. Cl.
CPC .......... *D21H 21/14* (2013.01); *B27K 3/08* (2013.01); *B27K 3/153* (2013.01); *B27K 3/38* (2013.01); *C08L 33/08* (2013.01); *C08L 33/10* (2013.01); *C08L 33/24* (2013.01); *C08L 97/02* (2013.01); *D21H 17/37* (2013.01); *D21H 17/375* (2013.01); *D21H 17/57* (2013.01); *B27K 3/15* (2013.01); *Y10T 428/4935* (2015.04); *Y10T 428/662* (2015.04)

(58) Field of Classification Search
None
See application file for complete search history.

(56) References Cited

U.S. PATENT DOCUMENTS

| | | | |
|---|---|---|---|
| 3,077,419 A * | 2/1963 | Kenaga | B27K 3/15 427/308 |
| 3,105,773 A | 10/1963 | Frank et al. | |
| 3,635,889 A | 1/1972 | Bowen | |
| 4,267,239 A * | 5/1981 | Thankachan et al. | 428/425.1 |

(Continued)

FOREIGN PATENT DOCUMENTS

| | | | |
|---|---|---|---|
| DE | 19857944 A1 * | 6/2000 | A01N 37/40 |
| EP | 0 755 952 | 1/1997 | |

(Continued)

OTHER PUBLICATIONS

International Preliminary Report on Patentability for Intl. Pat. Appln. No. PCT/US2011/042842, mailed on Jan. 16, 2014, 8 pp.

(Continued)

*Primary Examiner* — Monique Jackson
(74) *Attorney, Agent, or Firm* — Foley & Lardner LLP (57) ABSTRACT

A method of preserving cellulosic material is provided. The method includes contacting the cellulosic material with a paraben-containing monomer and polymerizing the paraben-containing monomer to provide a polymer impregnated within the cellulosic material; or alternatively, first polymerizing the paraben-containing monomer to give a polymer comprising repeat units formed of the monomer and contacting the cellulosic material with the polymer under pressure to provide the polymer impregnated with the cellulosic material. Articles including the cellulosic material and at least one polymer which includes paraben moieties are also provided, such as a wooden plank, a utility pole, a railroad tie, a ship's hull, a wooden utensil, a toy, a model, a piece of furniture, a vehicle, or a serving dish.

14 Claims, 4 Drawing Sheets

(56) References Cited

U.S. PATENT DOCUMENTS

| | | | | |
|---|---|---|---|---|
| 4,493,884 A | * | 1/1985 | Nagano | G03F 7/0233 430/165 |
| 4,923,894 A | * | 5/1990 | Kanda | A01N 25/10 106/15.05 |
| 5,692,938 A | | 12/1997 | Reither | |
| 6,162,546 A | * | 12/2000 | Harris et al. | 428/413 |
| 6,528,175 B2 | | 3/2003 | Grantham et al. | |
| 8,629,218 B2 | * | 1/2014 | Kania et al. | 525/329.5 |
| 2004/0234492 A1 | | 11/2004 | Stockel | |
| 2005/0031986 A1 | | 2/2005 | Kakino et al. | |
| 2007/0003710 A1 | | 1/2007 | Lynch et al. | |
| 2007/0178263 A1 | * | 8/2007 | Guilleux et al. | 428/35.2 |
| 2008/0139441 A1 | | 6/2008 | Xiao et al. | |
| 2009/0069522 A1 | | 3/2009 | Hessefort et al. | |

FOREIGN PATENT DOCUMENTS

| | | |
|---|---|---|
| EP | 0 761 702 | 3/1997 |
| EP | 0 765 890 | 4/1997 |
| EP | 0 843 218 | 5/1998 |
| EP | 1 117 004 | 7/2001 |
| EP | 0 686 726 | 1/2002 |
| EP | 1 338 921 | 8/2003 |
| EP | 1 391 784 | 2/2004 |
| EP | 1 627 734 | 2/2006 |
| EP | 1 059 162 | 4/2007 |
| JP | 54-135841 | 10/1979 |
| JP | 54-135842 | 10/1979 |
| JP | 58-197378 | 11/1983 |
| JP | 60-141587 | 7/1985 |
| JP | 63-115783 | 5/1988 |
| JP | 4054150 | 2/1992 |
| JP | 4054155 | 2/1992 |
| JP | 4149155 | 5/1992 |
| JP | 4235948 | 8/1992 |
| JP | 05155840 A * | 6/1993 |
| JP | 05-281716 | 10/1993 |
| JP | 08-184966 | 7/1996 |
| JP | 2002-040656 | 2/2002 |
| JP | 2002-049149 | 2/2002 |
| JP | 2002-049150 | 2/2002 |
| JP | 2002-311584 | 10/2002 |
| JP | 2002-322277 | 11/2002 |
| JP | 2002-351062 | 12/2002 |
| JP | 2002-372783 | 12/2002 |
| JP | 2003-005355 | 1/2003 |
| JP | 2003-005356 | 1/2003 |
| JP | 2003-107705 | 4/2003 |
| JP | 2003-186195 | 7/2003 |
| JP | 2003-195503 | 7/2003 |
| JP | 2003-228167 | 8/2003 |
| JP | 2003-233184 | 8/2003 |
| JP | 2004-045625 | 2/2004 |
| JP | 2004-510791 A | 4/2004 |
| JP | 2004-156169 A | 6/2004 |
| JP | 2004-317804 | 11/2004 |
| JP | 2005-031647 | 2/2005 |
| JP | 2005-060531 | 3/2005 |
| JP | 2006-091662 | 4/2006 |
| JP | 2006-215271 | 8/2006 |
| JP | 2006-227223 | 8/2006 |
| JP | 2007-106804 | 4/2007 |
| JP | 2008-081672 | 4/2008 |
| JP | 2008-179109 A | 8/2008 |
| JP | 2008-180045 A | 8/2008 |
| WO | WO-03/037532 | 5/2003 |
| WO | WO-2010/078413 | 7/2010 |

OTHER PUBLICATIONS

English machine translation of DE 19857944 A1 (REMMERS), published Jun. 21, 2000; machine translation accessed on Nov. 18, 2015 at http://www.google.com/patents/DE19857944A1?cl=en. (7 pages).

Chen, B. et al., "Candida antarctica Lipase B Chemically Immobilized on Epoxy-Activated Micro- and Nanobeads: Catalysts for Polyester Synthesis," Biomacromolecules, 2008, Published on Wen Jan. 16, 2008, vol. 9, pp. 463-471.

He, G. et al., "Synthesis of Poly(methyl methacrylate) Nanosize Particles by Differential Microemulsion Polymerization," Macromolecular Rapid Communications, 2003, vol. 24, No. 9, pp. 585-588.

International Search Report and Written Opinion for PCT/US2011/042842 mailed Aug. 22, 2011.

Kamogawa, H. et al., "Syntheses of polymerizable phenol derivatives having a carbonyl-containing group as a ring substituent," Journal of Polymer Science: Polymer Chemistry Edition, 1976, vol. 14, pp. 511-514.

Kimura, T. et al., "Synthesis of polymers bearing oligo-aromatic esters for second-order nonlinear optics," Macromolecular Chemistry and Physics, 2002, vol. 203, No. 4, pp. 761-770.

Ming, W. et al., "Synthesis of nanosize poly(methyl methacrylate) microlatexes with high polymer content by a modified microemulsion polymerization," Polymer Bulletin, 1998, vol. 40, pp. 749-756.

Nising, P. et al., "Thermal initiation of MMA in high temperature radical polymerization," Macromolecular Materials and Engineering, 2005, vol. 290, pp. 311-318.

Quan, C. et al., "High-temperature homopolymerization of ethyl acrylate and n-butyl acrylate: polymer characterization," Macromolecules, 2005, Published on Web Aug. 13, 2005, vol. 38, 2005, vol. 38, pp. 7619-7628.

* cited by examiner

PARABEN DERIVATIVES FOR PRESERVING CELLULOSIC MATERIALS

CROSS-REFERENCE TO RELATED APPLICATION

This application claims the benefit of International Application Serial No. PCT/US2011/042842, filed on Jul. 1, 2011, the entire disclosure of which is hereby incorporated by reference for all purposes in its entirety as if fully set forth herein.

FIELD

The present technology is generally related to the preservation of cellulosic materials with paraben-containing monomers and polymers.

BACKGROUND

The following description is provided to assist the understanding of the reader. None of the information provided or references cited is admitted to be prior art.

Wood is a ubiquitous renewable natural resource used in innumerable applications. When used as a structural material, wood is often treated with preservatives to increase its strength, durability, and resistance to decay by insects, bacteria, and fungi. Brown, white, and soft rot fungi are well-known for their ability to quickly decompose wood materials, particularly if the wood is damp or moist. While a variety of wood preservatives have been developed, many contain heavy metal components such as arsenic and copper (e.g., chromated copper arsenate, copper azoles, copper citrate, ammoniacal copper zinc arsenate, alkaline copper quaternary, etc.). Not only are such toxic preservatives difficult to apply to wood, they may also leach from preserved wood over time, contaminating the local environment. Even where heavy metal leaching from wood is not problematic, the safe disposal of such treated wood can be of concern.

SUMMARY

Paraben-containing preservatives for cellulosic materials are provided. The preservatives described herein are free of heavy metals, generally display low toxicity, and are environmentally benign. The preservatives are compatible with cellulosic materials, particularly with wood-based materials. Cellulosic materials treated with the paraben-containing preservatives display resistance to decay by bacteria and fungi.

In accordance with one aspect, an article including a cellulosic material and at least one polymer which includes paraben moieties is provided. The cellulosic material may be wood or paper. In some embodiments, the cellulosic material is wood, and the article is a plank, utility pole, railroad tie, ship's hull, utensil, toy, model, piece of furniture, vehicle, or serving dish. In some embodiments, the polymer includes at least one of a polyacrylate, a polymethacrylate, a polyolefin, a polyepoxy, a polyurethane, or a polyurea. In other embodiments, the polymer includes repeat units from a monomer represented by Formula I:

Formula I where $R^1$, $R^2$, $R^4$, and $R^5$ are each independently H, alkyl, alkenyl, or aryl; $R^3$ is OH or SH; $R^6$ is a bond, alkylene, alkyleneamino, or an alkyleneoxy moiety; and G is a polymerizable moiety. In some embodiments, $R^6$ of Formula I is a $C_1$-$C_{30}$ alkylene moiety, such as a methylene, ethylene, propylene, or butylene moiety, or is a polyalkyleneoxy moiety. In some other embodiments, $R^1$, $R^2$, $R^4$ and $R^5$ of Formula I are hydrogen. In other embodiments, $R^3$ of Formula I is a hydroxyl group.

In some embodiments, the moiety G of Formula I, includes an acrylate, methacrylate, acrylamide, epoxy, isocyanate, or olefin. In other embodiments, the moiety G is a group represented by one of the following formulas:

where $R^7$ is H, alkyl, alkenyl, alkynyl, alkoxy, ester, or CN; $R^8$ is H, alkyl, alkenyl, alkynyl, alkoxy, ester, or CN; $R^9$ may be present from 0 to 4 times, and when present, each $R^9$ is independently halo, CN, $NO_2$, alkyl, alkenyl, or alkynyl; and $R^{10}$ is H or alkyl.

In accordance with another aspect, a method of preserving a cellulosic material is provided, the method including contacting the cellulosic material with a monomer of Formula I; and polymerizing the monomer of Formula I, i.e., the monomer of Formula I is polymerized while it is in contact with the cellulosic material. In one embodiment, the method includes contacting the cellulosic material with the monomer of Formula I using a pressure process or a pressure fluctuation process. In another embodiment, the method includes impregnating the cellulosic material with the monomer of Formula I. In another embodiment, the polymerizing step includes heating, exposing the cellulosic material to UV light, adding a thermal initiator, adding a photochemical initiator, or combinations thereof. Finally, in accordance with another aspect, a method of preserving a cellulosic material is provided, the method including polymerizing a monomer of Formula I to give a polymer and contacting the cellulosic material with the polymer.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The technology is described herein using several definitions, as set forth throughout the specification.

The use of the terms "a" and "an" and "the" and similar referents in the context of describing the elements (especially in the context of the following claims) are to be construed to cover both the singular and the plural, unless otherwise indicated herein or clearly contradicted by context.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Alkyl groups include straight chain and branched chain alkyl groups which may be substituted or unsubstituted. In some embodiments, an alkyl group has from 1 to 30 carbon atoms, from 1 to 24 carbons, from 1 to 18 carbons, from 1 to 12 carbons, from 1 to 8 carbons or, in some embodiments, from 1 to 6, or 1, 2, 3, 4 or 5 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups.

Cycloalkyl groups are cyclic alkyl groups. In some embodiments, cycloalkyl groups have from 3 to 30 carbon atoms. In some embodiments, the cycloalkyl group has 3 to 10 or 3 to 7 ring members, whereas in other embodiments the number of ring carbon atoms range from 3 to 5, 3 to 6, or 5, 6 or 7. Cycloalkyl groups further include monocyclic, bicyclic and polycyclic ring systems. Monocyclic groups include, e.g., cyclopropyl, cyclobutyl, cyclopentyl, cyclohexyl, and cycloheptyl groups. Bicyclic and polycyclic cycloalkyl groups include bridged or fused rings, such as, but not limited to, bicyclo[3.2.1]octane, decalinyl, and the like. Cycloalkyl groups include rings that are substituted with straight or branched chain alkyl groups. In some embodiments, the cycloalkyl groups are substituted cycloalkyl groups. Representative substituted alkyl groups may be mono-substituted or substituted more than once, such as, but not limited to, mono-, di- or tri-substituted with substituents such as those listed herein.

Alkenyl groups include straight and branched chain alkyl groups as defined above, except that at least one double bond exists between two carbon atoms. In some embodiments, alkenyl groups have from 2 to 30 carbon atoms, and typically from 2 to 10 carbons or, in some embodiments, from 2 to 8, 2 to 6, or 2 to 4 carbon atoms. Examples include, but are not limited to vinyl, allyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, among others. Representative substituted alkenyl groups may be mono-substituted or substituted more than once, such as, but not limited to, mono-, di- or tri-substituted with substituents such as those listed herein.

Alkynyl groups include straight and branched chain alkyl groups as defined above, except that at least one triple bond exists between two carbon atoms. In some embodiments, alkynyl groups have from 2 to 30 carbon atoms, and typically from 2 to 10 carbons or, in some embodiments, from 2 to 8, 2 to 6, or 2 to 4 carbon atoms. Examples include, but are not limited to —C≡CH, —CH═CCH$_3$, —CH$_2$C≡CH, —CH(CH$_3$)C≡CH, —CH$_2$C≡CCH$_3$, —CH(CH$_2$CH$_3$)C≡CH, among others. Representative substituted alkynyl groups may be mono-substituted or substituted more than once, such as, but not limited to, mono-, di- or tri-substituted with substituents such as those listed herein.

Aryl groups are cyclic aromatic hydrocarbons of 6 to 14 carbons that do not contain heteroatoms. Aryl groups herein include monocyclic, bicyclic and tricyclic ring systems. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain from 6 to 12 or even 6 to 10 carbon atoms in the ring portions of the groups. In some embodiments, the aryl groups are phenyl or naphthyl. The phrase "aryl groups" includes groups containing fused rings, such as fused aromatic-aliphatic ring systems (e.g., indanyl, tetrahydronaphthyl, and the like). Aryl groups may be unsubstituted, monosubstituted, or substituted more than once with substituents such as those indicated herein.

Alkoxy groups are hydroxyl groups (—OH) in which the bond to the hydrogen atom is replaced by a bond to a carbon atom of an alkyl group as defined above. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Representative substituted alkoxy groups may be substituted one or more times with substituents such as those indicated herein.

The terms "alkylene," "cycloalkylene," "alkenylene," "alkynylene," and "arylene" alone or as part of another substituent means a divalent radical derived from an alkyl, cycloalkyl, alkenyl, alkynyl, or aryl group, respectively. Alkylene, cycloalkylene, alkenylene, alkynylene, and arylene groups may be substituted or unsubstituted. Examples of alkylene, cycloalkylene, alkenylene, alkynylene, and arylene groups include, but are not limited to —CH$_2$CH$_2$CH$_2$CH$_2$—, —CH═CHCH$_2$CH$_2$—, cyclohexylene (i.e., —C$_6$H$_{10}$—) (phenylene (i.e., —C$_6$H$_4$—), naphthalene (i.e., —C$_{10}$H$_6$—), —CH$_2$—CH$_2$—O—CH$_2$CH$_2$—, and —CH$_2$—S—CH$_2$—CH$_2$—NH—CH$_2$—. For alkylene, cycloalkylene, heteroalkylene, alkenylene, alkynylene, and arylene groups, no orientation of the group is implied. For alkylene groups substituted with heteroatoms, such as N, O, or S, heteroatoms can also occupy either or both of the chain termini, or may be interior to the chain.

The term "alkyleneoxy" is a substituted alkylene group which includes at least one oxygen atom. The oxygen atom or atoms may occupy either or both of the chain termini, or may be interior to the chain. In some embodiments, the alkyleneoxy group is a $C_1$-$C_{30}$ alkyleneoxy group, such as —$CH_2CH_2O$—, —$(CH_2CH_2O)_2$—, —$CH_2CH(CH_3)O$—, and the like. Alkyleneoxy groups may be substituted or unsubstituted. In other embodiments, the alkyleneoxy group is a polyalkyeneoxy group. Examples of polyalkyleneoxy groups include divalent radicals derived from polyalkylene glycols, such as a divalent radical derived from polyethylene glycol, as exemplified by —$(CH_2CH_2O)_n$—, where n is an integer from 1 to 1,000,000.

The term "alkyleneamino" is a substituted alkylene group which includes at least one amino group. The amino group or groups may occupy either or both of the chain termini, or may be interior to the chain. In some embodiments, the alkyleneamino group is a $C_1$-$C_{30}$ alkyeneamino group, such as —$CH_2CH_2NH$—, —$CH_2CH(CH_3)NH$—, and the like. Alkyleneamine groups may be substituted or unsubstituted.

The term "ester" as used herein refers to —COOR groups, where R is a substituted or unsubstituted alkyl, cycloalkyl, alkenyl, alkynyl, aryl, or aralkyl group as defined herein.

The term "amine" (or "amino") as used herein refers to —NHR and —NRR' groups, wherein R, and R' are independently hydrogen, or a substituted or unsubstituted alkyl, alkenyl, alkynyl, cycloalkyl, or, aryl group as defined herein. Examples of amino groups include —$NH_2$, methylamino, dimethylamino, ethylamino, diethylamino, propylamino, isopropylamino, phenylamino, benzylamino, and the like.

The term "thiol" or "mercapto" refers to —SH groups, while the term "sulfide" refers to —SR groups, where R is a substituted or unsubstituted alkyl, cycloalkyl, alkenyl, alkynyl, or aryl group as defined herein.

The term "hydroxyl" refers to —OH groups.

The term "halo" or "halogen" refers to —F, —Cl, —Br, and —I groups.

The term "cyano" or "nitrile" refers to —CN groups.

The term "peroxide" refers to —O—O— groups.

The term "acyl" refers to —C(O)R groups, where R is a substituted or unsubstituted alkyl, cycloalkyl, alkenyl, alkynyl, or aryl group as defined herein.

The term "azonitrile" refers to compounds which contain both an azo group, —N=N—, and at least one nitrile group, used to initiate a polymerization reaction. Non-limiting examples of azonitriles include is azobisisobutyronitrile (AIBN), 4,4-azobis(4-cyanovaleric acid), and azobiscyclohexanecarbonitrile (ABCN).

The term "carbonyl" is used to describe a C=O substituent. The term "oxo" refers double bonded oxygen in a carbonyl.

"Substituted" refers to a chemical group as described herein that further includes one or more substituents, such as lower alkyl (including substituted lower alkyl such as haloalkyl, hydroxyalkyl, aminoalkyl), aryl (including substituted aryl), acyl, halogen, hydroxy, amino, alkoxy, alkylamino, acylamino, thioamido, acyloxy, aryloxy, aryloxyalkyl, carboxy, thiol, sulfide, sulfonyl, oxo, both saturated and unsaturated cyclic hydrocarbons (e.g., cycloalkyl, cycloalkenyl), cycloheteroalkyls and the like. These groups may be attached to any carbon or substituent of the alkyl, alkenyl, alkynyl, aryl, cycloheteroalkyl, alkylene, alk-enylene, alkynylene, arylene, hetero moieties. Additionally, the substituents may be pendent from, or integral to, the carbon chain itself.

Esters of para-hydroxybenzoic acid, commonly referred to as "parabens," are class of organic molecules which generally possess antimicrobial properties, acting as bactericides and fungicides. Parabens typically have low irritant and sensitizing potential and are considered to be non-toxic materials. Accordingly, they find widespread application consumer products including, shampoos, moisturizers, gels, toothpaste, makeup, skin care products, and the like. The general structure of parabens includes a hydroxybenzoate moiety (or a salt form thereof) and is shown below.

Y = H, Na, etc.
Z = Me, Et, Pr, iPr, Bu, iBu, Bn, etc.

Because of their widespread use, many parabens are produced synthetically on industrial scale, and are available at low cost.

The instant technology is generally directed to methods of preserving cellulosic materials with paraben-containing monomers and polymers and to cellulosic articles which have been preserved with such paraben-containing monomers and polymers. The paraben-containing monomers and polymers are characterized by a strong ability protect cellulosic materials against degradation by microbes including bacteria and fungi.

In one aspect, paraben-containing preservatives for cellulosic materials are provided. The paraben-containing preservatives include polymeric preservatives which contain paraben moieties ("paraben-containing polymers"), as well as monomeric preservatives which contain paraben moieties that may be polymerized ("paraben-containing monomers"). In either case, the paraben-containing preservatives protect materials such as wood or paper from degradation. As presented more fully below, a variety of types of paraben-containing polymers may be prepared by polymerization of paraben-containing monomers. The monomeric or polymeric paraben-containing preservatives may be applied to cellulosic materials using a variety of methods. In the case of paraben-containing monomers, the monomers may be applied to a cellulosic material and then polymerized while in contact with the cellulosic material.

Any cellulosic material, such as wood or paper, may be treated with the paraben-containing preservatives described herein. Where wood is being preserved, the wood may be in a variety of forms, including but not limited to, lumber (typically planks, boards, beams, plywood, sheets, particle board, pressed boards, and the like), wood fiber, wood particles, wood chips, ground wood, wood flour, wood flakes, wood veneers, wood laminates, saw dust and the like. Of course, innumerable of articles may be prepared from wood treated with the paraben preservatives, such as wooden planks, poles (e.g., utility poles), railroad ties, ships' hulls, wooden utensils (e.g., spoons), kitchenware (e.g., wooden serving dishes), toys and models, pieces of furniture, vehicle components, and the like.

In one aspect, an article is provided which includes a cellulosic material and at least one polymer which includes paraben moieties. The polymer may be prepared by polymerization of paraben-containing monomers. The type of polymer formed in the polymerization will depend upon the identity of the paraben-containing monomer which has been polymerized. For example, if a paraben-containing monomer includes a vinyl group, such a monomer may be polymerized to provide a polyolefin which includes paraben moieties. Non-limiting examples of polymers which may include paraben moieties include: polyacrylates, polymethacrylates, polyacrylamides, polyolefins, polyepoxies, polyurethanes, and polyureas. Furthermore, a paraben-containing monomer may be copolymerized with one or more non-paraben-containing monomers to provide copolymers which contain paraben moieties. For example, a paraben-containing monomer including a vinyl group may be copolymerized with another vinyl monomer such as styrene, butadiene, or vinyl chloride.

In some embodiments, the polymer includes repeat units formed from a monomer represented by Formula I:

Formula I where $R^1$, $R^2$, $R^4$, and $R^5$ are each independently H, alkyl, alkenyl, or aryl; $R^3$ is OH or SH; $R^6$ is a bond, alkylene, alkyleneamino, or an alkyleneoxy moiety; and G is a polymerizable moiety. The polymer may include a mixture of any two or more monomers described by Formula I. Thus, in some embodiments, the polymer is a homopolymer of based upon the monomer of Formula I, while in other embodiments, the polymer is a co-polymer based upon different monomers of Formula I.

In Formula I, $R^6$ is a group which links the polymerizable moiety, G, to a hydroxybenzoate or a mercaptobenzoate moiety. $R^6$ is may be an alkylene, alkyleneamino, or an alkyleneoxy moiety. In some embodiments, $R^6$ is $C_1$-$C_{30}$ alkylene moiety, such as a methylene, ethylene, propylene, or butylene group. In some embodiments, $R^6$ is an alkyleneoxy moiety, such as a polyalkyleneoxy moiety. In this regard, the linking group $R^6$, may be an oligomeric or polymeric linking group such as polyethylene glycol (PEG) and/or polypropylene glycol linking groups.

In some embodiments of the monomer of Formula I contains a 1,4-disubstituted aromatic ring, i.e., $R^1$, $R^2$, $R^4$, and $R^5$ are hydrogen. In other embodiments, $R^3$ is a hydroxyl group. In other embodiments, $R^1$, $R^2$, $R^4$, and $R^5$ are hydrogen and $R^3$ is hydroxyl group.

In Formula I, the G group is a polymerizable moiety. The term "polymerizable moiety" means a moiety which reacts to form a polymer. For example, if polymerizable moiety includes an olefin moiety, such a moiety may be polymerized to form a polyolefin. If the polymerizable moiety contains an acrylate or methacrylate moiety, such a moiety may be polymerized to form a corresponding polyacrylate or polymethacrylate. Similarly, the polymerizable moiety may be an acrylamide, epoxide, alcohol, amine, carboxylic acid, carboxylic acid halide, ester, isocyanate, and the like, as to provide a polyacrylamide, polyepoxy, polyurethane, polyurea, polyester, etc.

In other embodiments, the G group of Formula I is represented by one of the following groups:

where $R^7$ is H, alkyl, alkenyl, alkynyl, alkoxy, ester, or CN; $R^8$ is H, alkyl, alkenyl, alkynyl, alkoxy, ester, or CN; $R^9$ may be present from 0 to 4 times, and when present, each $R^9$ is independently halo, CN, $NO_2$, alkyl, alkenyl, or alkynyl; and $R^{10}$ is H or alkyl. The monomers which include the above polymerizable groups may be used to prepare polyacrylates, polymethacrylates, polycyanoacrylates, polyacrylamides, polymethacrylamides, polystyrenes, and derivatives thereof, each of which contain paraben moieties.

In other embodiments, the moiety G of Formula I is a styryl group represented by the following structure:

Polymerization of such a monomer provides a polystyrene which contains paraben moieties.

In other embodiments, the monomer of Formula I includes an acrylate or methacrylate moiety, G, represented by the following structure:

where $R^1$, $R^2$, $R^4$, and $R^5$ are H; $R^6$ is a $C_1$-$C_{10}$ alkylene or $C_2$-$C_{10}$ alkyleneoxy moiety; and $R^7$ is H, alkyl, alkenyl, alkynyl, alkoxy, ester, or CN. Polymerization of such monomers provide a polyacrylate or polymethacrylate which contains paraben moieties.

In other embodiments, the monomer of Formula I includes an acrylamide or methacrylamide moiety, G, represented by the following structure:

$R^1$, $R^2$, $R^4$, and $R^5$ are H; $R^6$ is a $C_1$-$C_{10}$ alkylene or $C_2$-$C_{10}$ alkyleneoxy moiety; $R^7$ is $R^7$ is H, $C_1$-$C_4$ alkyl, $C_1$-$C_4$ alkenyl, $C_1$-$C_4$ alkynyl, $C_1$-$C_4$ alkoxy, ester, or CN; and $R^8$ is H, $C_1$-$C_4$ alkyl, $C_1$-$C_4$ alkenyl, $C_1$-$C_4$ alkynyl, $C_1$-$C_4$ alkoxy, ester, or CN. Polymerization of such a monomers provide a polyacrylamide which contains paraben moieties.

Figure 1:
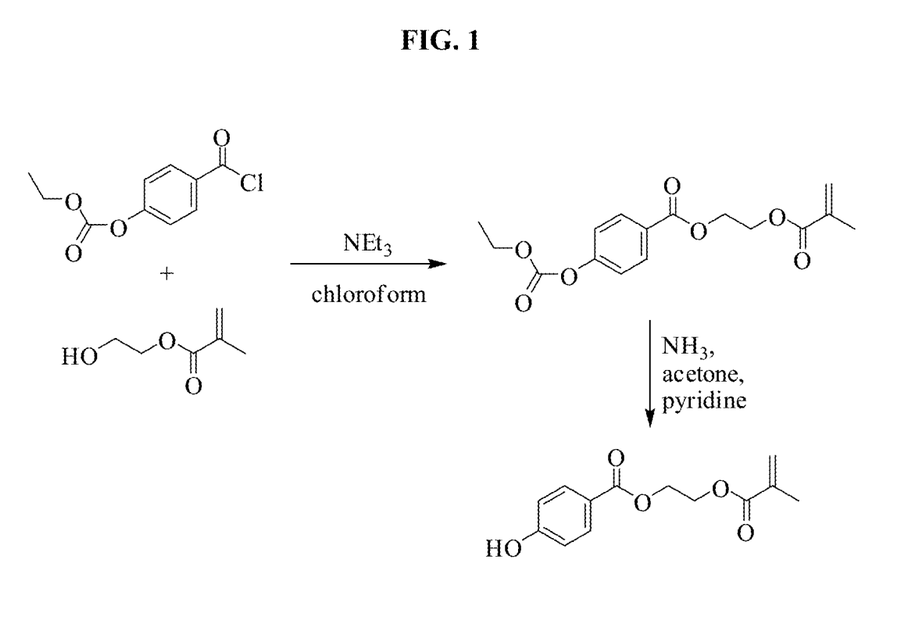
FIG. 1 is a schematic illustration of the preparation of an illustrative paraben-containing acrylic monomer, according to one embodiment.
Figure 2:
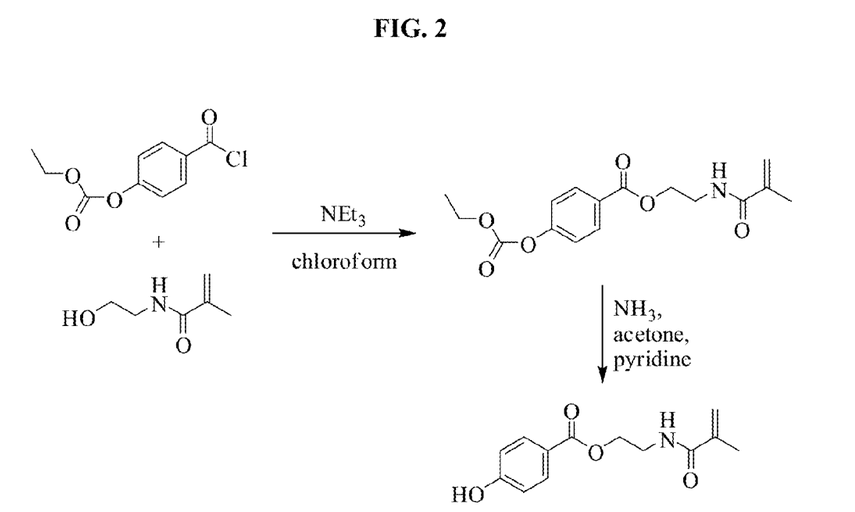
FIG. 2 is a schematic illustration of the preparation of an illustrative paraben-containing acrylamide monomer, according to one embodiment.
Figure 3:
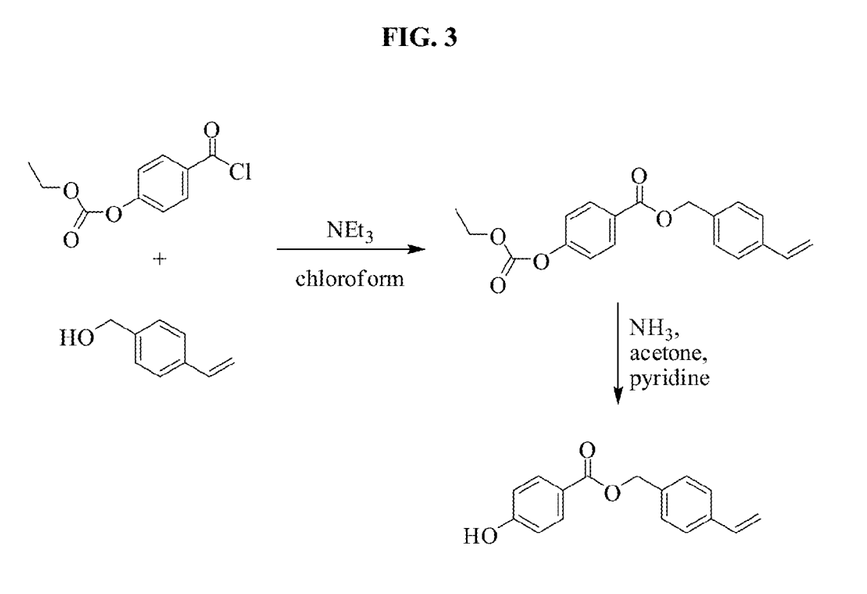
FIG. 3 is a schematic illustration of the preparation of an illustrative paraben-containing vinyl monomer, according to one embodiment.

In other embodiments, the monomer is represented by one or more of the following structures:

The syntheses of each of these monomers are illustrated in FIGS. 1-3 and are further detailed in the Examples, below.

According to another aspect, a paraben-containing monomer, such as the monomer of Formula I, is contacted with, or applied to, the cellulosic material. Such a paraben-containing monomer is polymerized while it is in contact with the cellulosic material. In this regard, polymerization of the paraben-containing monomer ensures that the preservative does not leach significantly from the cellulosic material over time. Thus, when polymerized, the paraben preservative is in more permanent contact with the cellulosic material, increasing the lifespan of the preserved cellulosic material, with respect to decay by bacteria and/or fungi. Furthermore, polymerization serves to prevent the paraben-containing preservative from entering the environment. Cellulosic materials which have been treated with a paraben-containing monomer will generally have a longer lifespan if the monomer is further polymerized after application.

The paraben-containing monomer may be applied to the cellulosic material in a variety of processes well known in the art. For example, the paraben-containing monomer may be applied using a non-pressure process, such as by brushing, spraying, dipping, soaking, steeping, and the like. Pressure treatment processes may also be used to apply the paraben-containing monomers. Pressure treatment processes typically employ closed vessels and have numerous advantages over non-pressure processes, such as the ability to control and vary the penetration or impregnation of the preservative into the cellulosic material. In contrast to non-pressure processes, pressure processes allow for deeper penetration and/or absorption of the preservative, making the preserved cellulosic material more resistant to degradation over a longer period of time. Furthermore, the pressure processes are easily adapted to large scale wood treatment, such as in the treatment of railroad ties, telephone poles, building members, and other structural materials. A variety of modifications of pressure treatment processes known in the art, such as full-cell processes, empty-cell processes, and fluctuation pressure processes may be used to apply the paraben-containing monomers to cellulosic materials. In the full cell process, the desired absorption of a given paraben-containing monomer is achieved through adjusting the concentration of the monomer in the solution. In the fluctuation pressure process, the pressure inside a preservative application cylinder is varied between low and high pressures over short time intervals. While preservative penetration depths are generally limited, such fluctuation pressure processes are useful for preserving wood which is prone to splitting or failing in other pressure processes.

The method of application of the paraben-containing monomers to the cellulosic material may vary depending on the specific identity of the paraben-containing monomer and the specific material being treated. For example, the paraben-containing monomer, such as the monomer of Formula I, may either be applied to the cellulosic material in neat form or may be diluted with a solvent prior to application. The solvent will be selected based on a number of factors, including cost, compatibility (i.e., non-reactivity) towards the paraben-containing monomer, solubility of the paraben-containing monomer, toxicity, ease of evaporation, etc. Non-limiting examples of solvents which may be used include water, hexane, acetone, ethyl acetate, methyl acetate, tert-butyl acetate, dimethyl carbonate, propylene carbonate, diethyl ether, methylene chloride, toluene, p-chlorobenzotrifluoride, silicones, silanes, methylated siloxanes, and the like. For environmental reasons, the solvent selected may be a non-volatile organic compound (non-VOC), such as those indicated under 40 C.F.R. 51.100(s). The paraben-containing monomer may be applied to the cellulosic material as a dispersion, such as an aqueous dispersion. Finally, the paraben-containing monomer may be applied to the cellulosic material in the presence of other polymerizable monomers, such that, upon polymerization, a copolymer which includes paraben moieties may be formed.

Depending on the specific process used to apply the paraben-containing monomer to the cellulosic material, the specific type of cellulosic material being preserved, and the desired level of preservation, varying levels of impregnation will be obtained. In some embodiments, wood is the cellulosic material, and the wood is impregnated to a depth below the surface of the wood less than about 1,000 μm, less than about 750 μm, less than about 500 μm, less than about 250 μm, less than about 100 μm, or less than about 50 μm. In some embodiments, there is minimal or negligible impregnation of the wood with the paraben-containing monomer, i.e., the paraben-containing monomer is present substantially only on the surface of the cellulosic material. In other embodiments, the paraben-containing monomer is impregnated into the cellulosic material at depths greater than about 1 mm, greater than about 2 mm, greater than about 5 mm, greater than about 1 cm, greater than about 2 cm, or greater than about 5 cm. In other embodiments, the paraben-containing monomer is impregnated into the cellulosic material at depths from about 1 mm to about 5 cm, from about 1 mm to about 4 cm, from about 1 mm to about 3 cm, from about 1 mm to about 2 cm, from about 1 mm to about 1 cm, or from about 1 mm to about 0.5 cm. In some embodiments, the cellulosic material is completely impregnated with the paraben-containing monomer. The monomer may be uniformly or non-uniformly distributed within the cellulosic material. In other embodiments, there is a gradient concentration of the paraben-containing monomer in the cellulosic material, having a higher concentration near the surface of the cellulose and decreasing in concentration farther from the surface. In some embodiments, the weight percentage of the monomer in the cellulosic material is from about 0.001% to about 90%, about 0.001% to about 50%, about 0.001% to about 10%, about 0.001% to about 5%, about 0.01% to about 3%, about 0.01% to about 1%, or about 0.3%. In some embodiments, the paraben-containing monomer is the monomer of Formula I.

Figure 4:
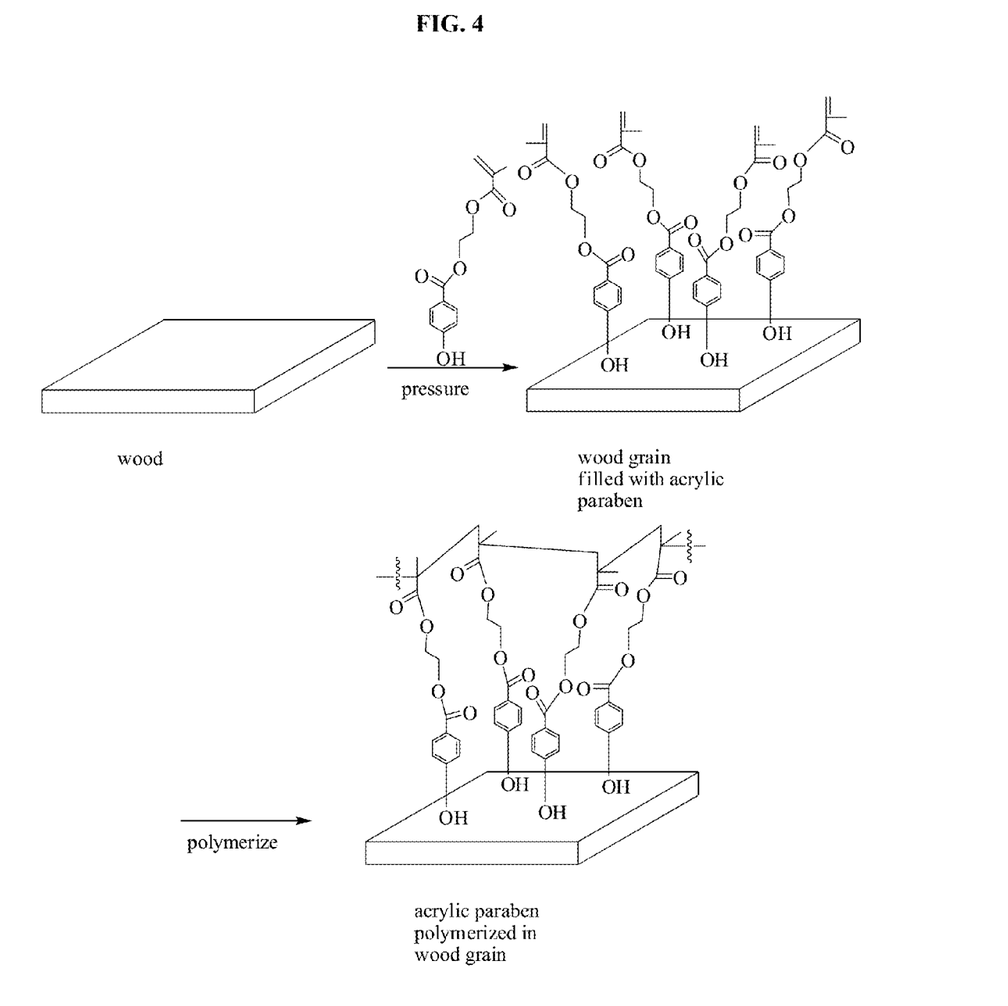
FIG. 4 is a general illustration of a wood preservation method, according to one embodiment.

After the paraben-containing monomer has been applied to the cellulosic material, the monomer may be polymerized. As previously noted, while the paraben-containing monomer will itself preserve the cellulosic material, polymerization of the monomer will generally serve to keep the paraben-containing preservative on or within the cellulosic structure for a longer period of time. Furthermore, polymerization of the applied paraben-containing monomer can impart additional strength to the cellulosic material. The polymerization may be accomplished using a number of techniques. For example, the paraben-containing monomer may be polymerized by heating the monomer-treated cellulosic material at a temperature and for a time period to cause polymerization of substantially all the paraben-containing monomer. Examples of temperatures that may be used include temperatures of about 40° C., about 50° C., about 60° C., about 65° C., about 70° C., about 75° C., about 80° C., about 90° C., about 100° C., about 120° C., about 140° C., about 160° C., about 180° C., about 200° C., about 220° C., about 240° C., about 260° C., about 280° C., or about 300° C., or ranges between any two of these values. The polymerization reaction may proceed for about 10 minutes, about 30 minutes, about 1 hour, about 2 hours, about 3 hours, about 4 hours, about 5 hours, about 6 hours, about 7 hours, about 8 hours, about 12 hours, about 16 hours, about 20 hours, about 1 day, about 2 days, about 3 days, longer than about 3 days, or ranges between any two of these values. A general illustration of one embodiment of the wood preservation process, employing an acrylic paraben-containing monomer, is shown in FIG. 4. The polymerization reaction may be coupled to the application of the paraben-containing monomer. For example, the paraben-containing monomer may be applied to the cellulosic material in a pressure fluctuation process, and, after application, the temperature of the pressure vessel raised as necessary to effect the polymerization reaction.

The polymerization reaction may also be initiated by ultraviolet (UV) light, by a thermal initiator, or by a photochemical initiator. Numerous thermal and photochemical initiators are known in the art. Non-limiting examples include: an azonitrile (such as azobisisobutyronitrile), an acyl peroxide (such as lauroyl peroxide or benzoyl peroxide), ammonium persulfate, 2,2-azobis(2-methylpropionamidine) dihydrochloride, tert-butyl peroxybenzoate, tert-amyl peroxybenzoate, peracetic acid, dicumyl peroxide, tert-butyl peracetate, 2,2-dimethoxy-2-phenylacetophenone, 2-hydroxy-2-methylpropiophenone, 9,10-phenanthrenequinone, 6-hydroxy-2,4,5,7-tetraiodo-3-oxo-3H-xanthene-9-carbonitrile, 3-butyl-2-[5-(3,3-dimethyl-1-propyl-1,3-dihydro-indol-2-ylidene)-penta-1,3-dienyl]-1,1-dimethyl-1H-benzo[e]indolium triphenylbutylborate, or 2-[2-[2-chloro-3-[(1,3-dihydro-1,1,3-trimethyl-2H-benz[e]indol-2-ylidene) ethylidene]-1-cyclohexen-1-yl]ethenyl]-1,1,3-trimethyl-1H-benz[e]indolium butyltriphenylborate ("H-Nu-IR 815," available from Spectra Group Limited, Inc., Millbury, Oh.). In the case of thermal or photochemical initiators, such initiators may be applied to the cellulosic material when the paraben-containing monomer is applied (e.g., a solution of a monomer of Formula I along with a thermal initiator selected to initiate the polymerization reaction at a certain temperature).

In another aspect, the paraben-containing monomer may be polymerized, and the resultant polymer applied to the cellulosic material. For example, a polymer including paraben moieties may be dissolved in a suitable solvent and spray applied to wood. Alternatively, the polymer including paraben moieties may be applied to wood under pressure as a dispersion, such as a dispersion in water.

In some embodiments, the fungal growth on the preserved cellulosic material is reduced by about 10% to about 100% in comparison to an unpreserved cellulosic material. As used herein, the phrase "unpreserved cellulosic material" means a cellulosic material which has not been treated with a preservative, including the paraben-containing monomers or paraben-containing polymers described herein. Reduction in fungal growth on a treated cellulosic material in comparison to an untreated cellulosic material may be measured over a time period of about one day, about one week, about one month, about 3-6 months, about one year, or about 1-5 years. In some embodiments, fungal growth is prevented. In this regard, fungal growth may be prevented for at least one month, one year, five years, or longer than five years.

The present technology, thus generally described, will be understood more readily by reference to the following examples, which is provided by way of illustration and is not intended to be limiting of the present technology.

EXAMPLES

Example 1

Synthesis of a paraben-containing acrylic monomer: 2-(2-methylacryloyloxy)ethyl 4-hydroxybenzoate (FIG. 1). The synthetic procedure used to prepare 2-(2-methylacryloyloxy)ethyl 4-hydroxybenzoate was adapted from that described by T. Kimura et al., *Macromolecular Chemistry and Physics* 2002, 203(4), 761-770. To a solution of 2-hydroxyethyl methacrylate ("HEMA," 38 mL) and triethylamine (52 mL) in chloroform (100 mL) was added a solution of 4-ethoxycarbonyloxybenzoyl chloride (85 g) in chloroform (200 mL) in a drop-wise fashion with vigorous stirring. The reaction was cooled with an ice bath during the addition. The reaction mixture was allowed to stand overnight at room temperature. The resultant precipitate was filtered off and washed with chloroform. The combined organic phases were washed with aqueous $NaHCO_3$ (5 wt %) followed by water. The solvent was evaporated to give 2-(4-ethoxycarbonyloxybenzoyloxy)ethyl methacrylate (100 g) as a slightly brown oil in 85% yield. $^1$H NMR ($CDCl_3$): δ 1.40 (t, 3H), 1.95 (s, 3H), 4.34 (q, 2H), 4.52 (m, 4H), 5.60 (s, 1H), 6.13 (s, 1H), 7.27 (d, 2H), 8.08 (d, 2H).

A mixture of 2-(4-ethoxycarbonyloxybenzoyloxy)ethyl methacrylate (74 g), pyridine (450 mL), acetone (900 mL), and concentrated aqueous ammonia (20 mL) was stirred overnight at room temperature. After completion of the reaction, the mixture was acidified with concentrated hydrochloric acid. The resulting precipitate (triethylammonium chloride) was filtered off and dissolved in chloroform, and the solution is washed with 1N HCl, followed by water. The solvent was evaporated, and the residue was recrystallized from a chloroform-hexane mixture to provide 2-(2-methylacryloyloxy)ethyl 4-hydroxybenzoate in 60% yield. $^1$H NMR ($CDCl_3$): δ 2.00 (s, 3H), 4.50 (m, 4H), 5.50 (s, 1H), 6.15 (s, 1H), 6.85 (d, 2H), 8.12 (d, 2H).

Other paraben-containing acrylic (and methacrylic) monomers may be prepared using the above procedure by replacing 2-hydroxyethyl methacrylate with another hydroxy-functionalized acrylic monomer and modifying the final purification procedure as appropriate (recrystallization, chromatography, distillation, etc.). Examples of hydroxy-functionalized acrylic monomers which may be used include: 2-hydroxyethyl(meth)acrylate, 4-hydroxybutyl (meth)acrylate, 3-hydroxypropyl(meth)acrylate, 2-hydroxypropyl (meth)acrylate, methyl 3-hydroxy-2-methylenebutyrate, 2-hydroxypropyl 2-[(meth)acryloyloxy]ethyl phthalate, 3-chloro-2-hydroxypropyl(meth)acrylate, poly (propylene glycol)mono(meth)acrylate, poly(ethylene glycol)monoacrylate, bis(2-hydroxyethyl)itaconic acid, bis(3-hydroxypropyl)itaconic acid, bis(2-hydroxypropyl)itaconic acid, bis(4-hydroxybutyl)itaconic acid, bis(2-hydroxyethyl) maleic acid, bis(3-hydroxypropyl)maleic acid, bis(2-hydroxypropyl)maleic acid, bis(4-hydroxybutyl)maleic acid, bis(2-hydroxyethyl)fumaric acid, bis(3-hydroxypropyl)fumaric acid, bis(2-hydroxypropyl)fumaric acid, bis(4-hydroxybutyl)fumaric acid, and the like.

Example 2

Synthesis of an paraben-containing acrylamide monomer: 4-hydroxybenzoic acid, N-hydroxyethyl methacrylamide ester (FIG. 2). The synthesis of a paraben-containing acrylamide monomer may be performed analogously to that described in Example 1. In particular, a solution of N-hydroxyethyl methacrylamide and triethylamine in chloroform is added to a solution of 4-ethoxycarbonyloxybenzoyl chloride in chloroform in a drop-wise fashion with vigorous stirring. The reaction is cooled with an ice bath during the addition. The reaction mixture is allowed to stand overnight at room temperature. The resultant precipitate (triethylammonium chloride) is then to be filtered off and washed with chloroform. The combined organic phases are washed with aqueous $NaHCO_3$ (5 wt %) followed by water. The solvent is evaporated to give the hydroxy-protected acrylamide paraben, as illustrated by the process depicted in FIG. 2. To the hydroxy-protected acrylamide paraben is added pyridine, acetone, and concentrated aqueous ammonia. The mixture is stirred overnight at room temperature. After completion of the reaction, the mixture is acidified with concentrated hydrochloric acid. The resulting mixture is to be worked up as described in Example 1 to provide 4-hydroxybenzoic acid, N-hydroxyethyl methacrylamide ester. The material may optionally be purified by distillation, chromatography, or recrystallization.

Other paraben-containing acrylamide monomers may be prepared using the above procedure by replacing N-hydroxyethyl methacrylamide with another hydroxy-functionalized acrylamide monomer and modifying the final purification procedure as appropriate (recrystallization, chromatography, distillation, etc.). Examples of hydroxy-functionalized acrylamide monomers which may be used include: 3-acryloylamino-1-propanol, N-acryloylamidoethoxyethanol, N-hydroxyethyl acrylamide, N-(tris(hydroxymethyl)methyl)acrylamide, etc.

Example 3

Synthesis of a paraben-containing vinyl monomer: 4-hydroxybenzoic acid, 4-vinylbenzyl alcohol ester (FIG. 3). The synthesis of a paraben-containing vinyl monomer is illustrated in FIG. 3, and may be performed analogously to that described in Example 2, except that 4-vinylbenzyl alcohol is used in place of N-hydroxyethyl methacrylamide.

Other paraben-containing vinyl monomers may be prepared using the above procedure by replacing 4-vinylbenzyl alcohol with another hydroxy-functionalized vinyl monomer and modifying the final purification procedure as appropriate (recrystallization, chromatography, distillation, etc.). Examples of hydroxy-functionalized vinyl monomers which may be used include: 4-vinylphenol, 2-vinylphenol, 2-vinylbenzyl alcohol, 2-(4-vinylphenyl)ethanol, 2-(2-vinylphenyl)ethanol, and the like.

Example 4

Treatment of wood with 2-(2-methylacryloyloxy)ethyl 4-hydroxybenzoate, followed by polymerization (FIG. 4). 2-(2-methylacryloyloxy)ethyl 4-hydroxybenzoate (Example 1) is to be dissolved in toluene (20 wt %) and spray-applied or injected under high pressure (~250 atm, ~25,331 kPa) to southern pine sapwood blocks, until a loading of (~0.3 wt % of monomer in wood is obtained. The solvent is to be evaporated, and the treated board is placed into an oven. The board is heated at 65-75° C. for a period of five hours. The conversion of monomer to polymer may be monitored by FT-IR spectroscopy via disappearance of vinylic C—H stretching vibrations of the acrylic monomer. The paraben-containing monomers described in Examples 2-3 may be applied to wood in a similar fashion.

Example 5

Biological Evaluation. A. Petri Dish Studies. The biological activity of the paraben-containing acrylic monomer (Example 1), paraben-containing acrylamide monomer (Example 2), and paraben-containing vinyl monomer (Example 3) may be evaluated as follows. Malt extract agar plates are prepared using established procedures. In triplicate, each of the three paraben monomers at five different concentrations is applied to separate agar plates inoculated with a given test fungi (3×3×5=45 total plates per test fungi, along with additional non-amended control plates, i.e., plates which do not include paraben monomers). One stain fungus (*Ophiostoma picae*), 3 decay fungi (*Postia placenta, Gloeophyllum trabeum,* and *Trametes versicolor*), and two mold fungi (*Aspergillus niger* and a *Penicillium* spp.) will be evaluated. The plates are incubated until fungi has overgrown the plates with non-amended media (controls). Radial growth is to be measured and the measurements used to ascertain efficacy. The testing data is used to calculate the minimum inhibitory concentration for each of the paraben monomers. In general, radial growth of fungi in paraben-treated plates will be decreased from that of the control plates. For the purposes of comparison, the biological testing study may be repeated using known fungicides.

B. Soil Block Tests. Southern pine sapwood test blocks are oven dried, separately impregnated with the paraben-containing monomers from Examples 1-3 at a determined concentration, re-dried, and then sterilized. Untreated, control test blocks are also prepared. Decay chambers are prepared by half-filling glass bottles with soil. A wood feeder strip is placed on the soil surface of each jar and the jar is sterilized prior inoculation with a given test fungus (indicated in Example 5A). Once the fungus has grown across the feeder, a test block is placed on the surface of the soil and the jar is incubated for 12 to 16 weeks at 28° C. Weight loss at the end of the test (as measured by oven-drying and weighing each block) is used as the measure of fungal efficacy. In general, the paraben-treated blocks are expected to show increased resistance to fungal decay in comparison to control blocks. The results may then be used to calculate a threshold for protection. These experiments may be repeated including a wet/dry cycle prior to exposing the test blocks to a given test fungus. Finally, a non-sterile soil burial test may also be performed on test blocks to evaluate resistance of treated test blocks to bacteria and soft rot fungi in comparison to a control. Burial testing results are expected to show increased resistance to bacterial and fungal decay in comparison to control blocks.

C. Termite Testing. Treated test blocks (and controls) are prepared as described in Example 5B. The test blocks are exposed to a controlled environment with termites (e.g., in glass jars) and the treated test blocks are evaluated for resistance to termite decay (in comparison to control test blocks) by oven-drying and weighing each test block. In general, the paraben-treated blocks are expected to show increased resistance to termite damage in comparison to control blocks.

The above Petri dish studies (Example 5A), soil block tests (Example 5B), and termite testing (Example 5C) are repeated using the respective paraben-containing polymers (prepared from the corresponding paraben-containing monomers using standard polymerization techniques such as those described below) and similar results are obtained. Each of the paraben containing-polymers, as well as wood samples treated with such paraben-containing polymers, are expected to display resistance to fungi, bacteria, and termites.

Example 6

Polymerization of 2-(2-methylacryloyloxy)ethyl 4-hydroxybenzoate, followed by application of the polymer to wood. Ammonium persulfate initiator, sodium dodecyl sulfate (SDS) surfactant, and deionized water are placed into a reactor and the aqueous solution heated to 80° C. 2-(2-methylacryloyloxy)ethyl 4-hydroxybenzoate (Example 1) and 1-pentanol are added in a differential manner (continuously in small drops) by a mini-pump (Microfluidics peristaltic pump) over period of about 90 minutes. The reaction temperature is maintained at 80-85° C. for 60 minutes after the addition, and then the reaction is cooled to room temperature to provide the polyacrylate wood preservative in the form of nanoparticles. When a ratio of SDS to 2-(2-methylacryloyloxy)ethyl 4-hydroxybenzoate of 0.05 is employed, polyacrylate particles of ~20 nm are obtained after precipitation with 10% calcium chloride solution, followed by washing and drying.

The polyacrylate particles may alternatively be prepared as follows. In a 200-mL 3-neck flask equipped with a reflux condenser, a thermometer, an addition funnel, a motor driven impeller blade, and argon inlet and outlet, is loaded a transparent ternary microemulsion including 2-(2-methylacryloyloxy)ethyl 4-hydroxybenzoate (1.7 g), methyl methacrylate (0.3 g), dodecyltrimethylammonium bromide (1.0 g), and water (92 g). A solution of potassium persulfate (81 mg, 3 mmol/L based on initial microemulsion) in water (5 g) is added and argon was bubbled through the microemulsion for 5 minutes. The flask is heated to ~60° C. and held at this temperature for 10 minutes. Then, a 85/15 mixture 2-(2-methylacryloyloxy)ethyl 4-hydroxybenzoate/methyl methacrylate (9 g total) is continuously and slowly added via the addition funnel into the polymerizing microemulsion over a period of 2-3 hours with stirring (~600 rpm). After the addition is complete, the flask is kept at 60° C. for another 2 hours. After reaction work up, the polyacrylate particles thus obtained will have a particle size of ~30-50 nm.

After collection, the particles prepared by either of the above methods may optionally be cooled (such as with liquid nitrogen) as to cause rapid contraction of the particle and crack formation on the particle surface. Such cracking increases the surface area, and the preserving qualities of the polyacrylate.

The polyacrylate particles may be applied to wood by injecting a 5 wt % aqueous dispersion into wood at high pressure (~250 atm, ~25,331 kPa).

Example 7

Polymerization of 4-hydroxybenzoic acid, 4-vinylbenzyl alcohol ester, followed by application of the polymer to wood. Ammonium persulfate initiator, sodium dodecyl sulfate (SDS) surfactant, and deionized water are placed into a reactor and the aqueous solution heated to 80° C. The vinyl paraben from Example 3 and 1-pentanol is added in a differential manner (continuously in small drops) by a mini-pump over period of about 90 minutes. The reaction temperature is maintained at 80-85° C. for 60 minutes after the addition, and then the reaction is cooled to room temperature to provide the polyacrylate wood preservative in the form of nanoparticles. When a ratio of SDS to vinyl paraben monomer is 0.11 is employed, polyolefin particles of ~30 nm are obtained. The polyolefin particles are to be applied to wood in the manner described in Example 6.

EQUIVALENTS

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. An article comprising a cellulosic material and at least one polymer comprising paraben moieties impregnated within the cellulosic material, wherein the polymer comprises repeat units formed from a monomer of Formula I:

Formula I wherein:
$R^1$, $R^2$, $R^4$, and $R^5$ are each independently H, alkyl, alkenyl, or aryl;
$R^3$ is OH or SH;
G is a group of formula and
$R^6$ is an alkyleneamino or an alkyleneoxy moiety;
each $R^9$ is independently H, halo, CN, $NO_2$, alkyl, alkenyl, or alkynyl; and
$R^{10}$ is H or alkyl.

2. The article of claim 1, wherein the cellulosic material is wood or paper.

3. The article of claim 1 which is a wooden plank, utility pole, railroad tie, ship's hull, wooden utensil, toy, model, piece of furniture, vehicle, or serving dish.

4. The article of claim 1, wherein $R^1$, $R^2$, $R^4$ and $R^5$ are H.

5. The article of claim 1, wherein $R^6$ is a polyalkyleneoxy moiety.

6. The article of claim 1, wherein $R^3$ is OH.

7. The article of claim 1, wherein G is a group of formula

8. The article of claim 1, wherein the article is a wooden plank, a utility pole, a railroad tie, a ship's hull, a wooden utensil, a toy, a model, a piece of furniture, a vehicle, or a serving dish; and the cellulosic material is other than paper.

9. The article of claim 1, wherein
the article is a wooden plank, a utility pole, a railroad tie, a ship's hull, a wooden utensil, a toy, a model, a piece of furniture, a vehicle, or a serving dish;
the cellulosic material is other than paper; and
$R^6$ is an alkyleneamino or a polyalkyleneoxy moiety.

10. A method of preserving a cellulosic material, the method comprising:
contacting the cellulosic material with a monomer of Formula I; and
polymerizing the monomer of Formula I to provide a polymer impregnated within the cellulosic material;
wherein;

Formula I $R^1$, $R^2$, $R^4$, and $R^5$ are each independently H, alkyl, alkenyl, or aryl;
$R^3$ is OH or SH;
G is a group of formula and
$R^6$ is an alkyleneamino or an alkyleneoxy moiety;
each $R^9$ is independently H, halo, CN, $NO_2$, alkyl, alkenyl, or alkynyl; and
$R^{10}$ is H or alkyl.

11. The method of claim 10, wherein G is a group of formula

12. The method of claim 10, wherein the contacting comprises using a pressure process or a fluctuation pressure process.

13. A method of preserving a cellulosic material, the method comprising:
polymerizing a monomer of Formula I to give a polymer comprising repeat units formed from the monomer of Formula I; and
contacting the cellulosic material with the polymer under pressure to provide the polymer impregnated within the cellulosic material;
wherein;

Formula I $R^1$, $R^2$, $R^4$, and $R^5$ are each independently H, alkyl, alkenyl, or aryl;
$R^3$ is OH or SH;
G is a group of formula and
$R^6$ is an alkyleneamino or an alkyleneoxy moiety;
each $R^9$ is independently H, halo, CN, $NO_2$, alkyl, alkenyl, or alkynyl; and
$R^{10}$ is H or alkyl.

14. The method of claim 13, wherein G is a group of formula

* * * * *